Nov. 7, 1967 D. A. BRISTOL 3,350,945
DIGITAL SPAN ADJUSTER FOR DIFFERENTIAL
PRESSURE MEASURING DEVICE
Filed June 13, 1966
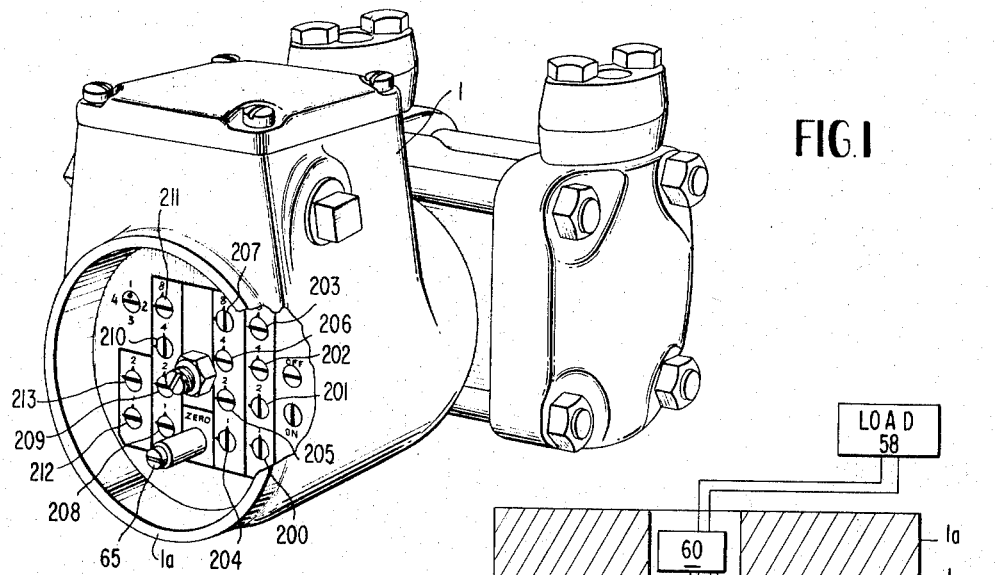
FIG.1
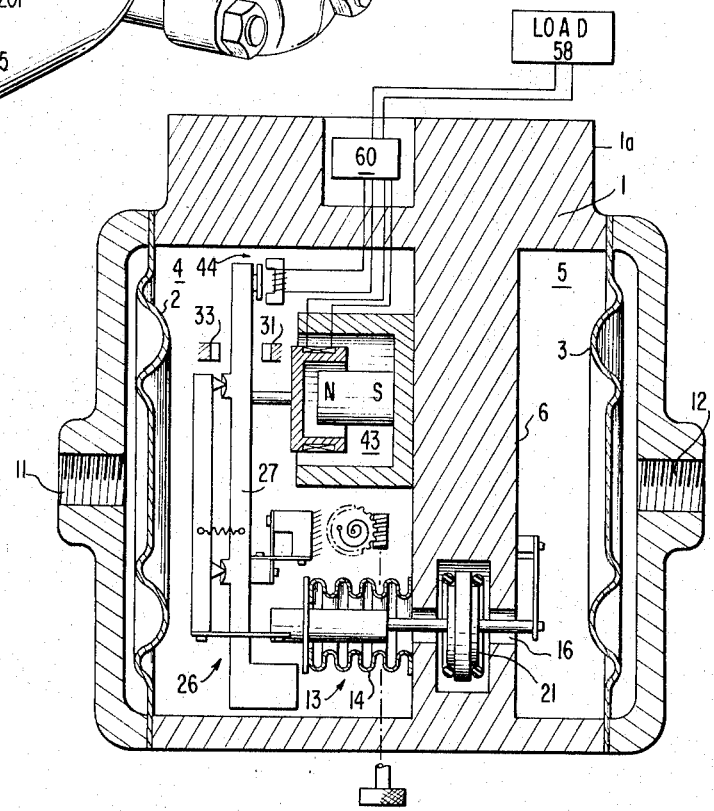
FIG. 2
FIG. 3
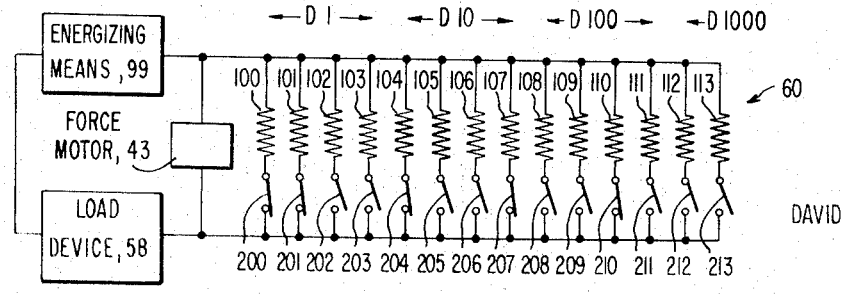
INVENTOR
DAVID A. BRISTOL
BY *Richard E. Hosley*
ATTORNEY United States Patent Office 3,350,945
Patented Nov. 7, 1967

3,350,945
DIGITAL SPAN ADJUSTER FOR DIFFERENTIAL PRESSURE MEASURING DEVICE
David A. Bristol, Lynnfield, Mass., assignor to General Electric Company, a corporation of New York
Filed June 13, 1966, Ser. No. 557,214
3 Claims. (Cl. 73—398)

This invention generally relates to differential pressure measuring devices and more particularly to an improved digital span adjusting means for such a pressure measuring device.

Pressure measuring devices to which this invention is particularly adapted generally include a hollow casing which is divided into four chambers by a central rigid partition and two flexible diaphragm members. Liquid fills the space formed between each diaphragm member and the rigid partition, and variable pressures are applied to the diaphragms causing a pressure differential to exist between each volume of liquid. This pressure differential is sensed by a servo system and converted to an output thereby. Such a differential pressure measuring device is claimed in the application of Harold E. Trekell, Ser. No. 451,547, "Pressure Measuring Device," filed Apr. 28, 1965, and assigned to the same assignee as the present invention.

In these force-balance, servo pressure transmitters the output is generally a direct current with the zero point being offset so that there is a definite current at the minimum pressure being measured and another definite current at the maximum pressure being measured. The difference between the minimum, or zero, current and the maximum, or full scale, current is the current span or output span of the transmitter. Most transmitters in this class have provision to adjust the magnitude of the input pressure span (i.e., the difference between the maximum and minimum pressures) that will give the nominal output current span and this is referred to as span adjustment. Percent span is 100× the ratio of the actual pressure span to the maximum pressure span to which the transmitter is capable of being adjusted. Percent of span differs from percent span in that it is usually used to define the magnitude of errors.

There are errors introduced into such a pressure transmitter which are independent of the input pressure span, directly proportional to span, and inversely proportional to span. Errors that are independent of span include those introduced when the operator adjusts the transmitter. Their magnitude depends on the limitations of the design of the adjustment and the capability of the operator. These limitations become especially apparent in prior art incorporating continuous span adjustments wherein the magnitude of the smallest adjustment depends on the operator's touch. Since adjusting a continuous span adjustment is difficult, the ability to repeat a particular adjustment after it has been varied is also difficult.

Other errors independent of span are caused by the inaccuracy of standards; these are generally so small as to be overlooked. Errors that are directly proportional to span include transmitter nonlinearity and hysteresis. Errors inversely proportional to span include transmitter output nonrepeatability under various ambient conditions.

It is an object of this invention to provide an improved pressure transmitter wherein the errors which are independent of span are substantially reduced.

It is another object of this invention to provide a pressure transmitter having a span adjustment which is characterized by having good repeatability.

One prior electrical span adjustment has been provided which utilizes shunt resistors in a straight binary relationship to provide the span adjustment. However, this particular method of span adjustment is generally complicated either because it requires an operator to convert decimal numbers to binary numbers or because it requires extensive tables to be produced in order to provide a proper span.

Therefore, another object of this invention is to provide a pressure transmitter which incorporates a span adjustment which is easy to operate.

Briefly stated, the above and further objects and advantages are obtained in accordance with this invention by providing a shunting network for the force motor means of the pressure transmitter which is arranged in a binary coded decimal configuration. The shunting network is divided into a plurality of shunting groups which are individually representative of a particular decimal decade and each of the decimal decade groups is divided into a plurality of binary shunting means which can be selectively switched in shunt with the force motor.

This invention is particularly pointed out in the appended claims. The above and further objects and advantages of this invention can be better understood by reference to the following description taken in conjunction with the accompanying drawings wherein:

FIGURE 1 illustrates a pressure transmitter in perspective to show a span adjustment means;

FIGURE 2 presents a schematic view of a pressure transmitter to which this invention is particularly adapted; and FIGURE 3 illustrates in schematic form the shunting network for the pressure transmitter.

FIGURE 1 illustrates a pressure transducer having a hollow casing 1 which contains the pressure transmitter section, the span adjustment means and other electrical connections.

In order to completely understand the span adjustment system and its use with a pressure sensitive device, it will be helpful to consider the improvement as applied to the particular pressure measuring device shown in FIGURE 2 and claimed in application Ser. No. 451,547, referred to above. As the particular pressure measuring device is clearly and completely described in the application, the operation of the device is described herein in terms of that application including the numerical designations therein to serve as background for this invention.

In use, inlet and outlet connections 11 and 12 in the hollow casing 1 are connected to pressure lines for measuring a difference in fluid pressure in such lines. They may, for example, be pressure lines leading from the upstream and downstream sides of an orifice or venturi disposed in a conduit carrying process fluid, the flow of which is to be measured or controlled.

Any difference in the pressure at the inlet conduits 11 and 12 is transmitted to liquid chambers 4 and 5 defined by the hollow casing 1, a rigid partition 6 and flexible isolating diaphragms 2 and 3. This difference appears across a flexible pressure sensitive element 13 which experiences a force proportional to the pressure difference. This force is applied to a lever system 26 tending to cause rotation thereof. A counterbalancing force is applied to the lever system 26 by a force motor 43, and the magnitude of the force applied is controlled by a position detector 44 to maintain the level system in a state of balance. The current applied to the force motor 43 is proportional to the differential pressure force exerted by the pressure sensitive element 13. Hence, the current magnitude in the force motor 43 is an indication of the differential pressure being measured; and this current is used to actuate a load device 58, which may be a meter, recorder or differential pressure control device. Protection of the device from overpressure is provided by means of stops 33 and 34 which limit the movement of a lever 27 and by a valve 21 which closes conduit 16 and thereby isolates a bellows 14 from further pressure increases in one or the other of the chambers. This produces an automatic overpressure device which does not interfere with the sensitivity and delicate force measuring operation of the balance lever system 26 during normal pressure conditions in the range being measured.

Generally, in order to provide accurate output readings for the load device 58, a pressure span selecting means in an electrical circuit 60 is provided which, in association with the zero set knob 65, produces a particular range of operating points for the pressure transmitter.

In FIGURE 3, an energizing means 99, the force motor 43 and the load device 58 are connected in series so that the load device 58 is energized by a current which indicates the level of energization of the force motor 43 required to balance the lever system 26. If a wide range of pressure inputs were applied without a current span adjustment means, a wide range of output or current spans would result. However, such a differential pressure transducer as shown normally is associated with process control systems having narrow input signal range requirements. In order to provide a current span which will match the input requirements of the control system for any pressure or input span, the force motor is shunted by a plurality of impedance means normally located in the electrical circuit 60 and capable of being selectively paralleled with the force motor 43. As these impedance means are switched into the force motor circuit, additional current appears in the load device 58. Therefore, if the input span does not produce an output signal which is sufficient to give a desired reading, additional impedance means can be added to thereby increase the current through the load device 58.

Such a plurality of impedance means are shown in schematic form in FIGURE 3 as being constituted by a plurality of resistors 100 through 113 and a plurality of switches 200 through 213 with each impedance means being constituted by a single resistor and a single switch in series. Although thirteen impedance means have been shown in this embodiment, the total number is unimportant and will be determined by the range of input and output spans which are required. However, the plurality of impedance means have been arranged into groups designated as D1, D10, D100, and D1000, so that D1 represents the units 1 through 9, D10 represents the tens from 10 through 90, D100 represents the hundreds from 100 through 900 and D1000 represents the thousands from 1000 through 3000.

Each of the decades is constructed in a similar form so that a detailed analysis of the decade D1 is sufficient to understand this invention. It can be seen that the decade D1 is constituted by four impedance means including the resistors 100, 101, 102 and 103 and four switches 200, 201, 202 and 203. In a preferred form of the invention, the resistors are chosen in a particular relationship as shown by Table I.

TABLE I

| Resistor: | Value |
|---|---|
| 100 | R |
| 101 | R/2 |
| 102 | R/4 |
| 103 | R/8 | where R designates a predetermined unit of resistance which provides a predetermined unit of conductance (1/R). If switches 200 and 201 are both closed, three conductance units are placed in parallel with the force motor 43. By selectively closing the switching means 200 through 203, a number of conductance units from 1 through 9 can be switched into parallel with the force motor 43.

Similarly, the additional decades D10, D1000 are also formed of additional resistors so that the total relationship between all the resistances and the resulting conductance units can be designated as shown in Table II.

TABLE II

| Decade | Switch | Value of Resistance | Units of Conductance |
|---|---|---|---|
| 1 | 200 | R | 1 |
|  | 201 | R/2 | 2 |
|  | 202 | R/4 | 4 |
|  | 203 | R/8 | 8 |
| 10 | 204 | R/10 | 10 |
|  | 205 | R/20 | 20 |
|  | 206 | R/40 | 40 |
|  | 207 | R/80 | 80 |
| 100 | 208 | R/100 | 100 |
|  | 209 | R/200 | 200 |
|  | 210 | R/400 | 400 |
|  | 211 | R/800 | 800 |
| 1000 | 212 | R/1000 | 1000 |
|  | 213 | R/2000 | 2000 |

Each pressure transducer is initially calibrated and a particular table of conductance units required to produce an optimum output span at a given input span. A portion of such a table is shown by Table III in order to facilitate further understanding of this invention.

TABLE III

| Input Pressure Applied Span (e.g. inches of water) | Initial Setting of Span Adjuster | Incremental Setting to Change Maximum Current by— | | | | |
|---|---|---|---|---|---|---|
| | | 0.2 ma. | 0.4 ma. | 0.6 ma. | 0.8 ma. | 1.0 ma. |
| 112 | 0392 | 0004 | 0008 | 0013 | 0017 | 0021 |
| 108 | 0423 | 0004 | 0009 | 0013 | 0017 | 0022 |
| 104 | 0457 | 0005 | 0009 | 0014 | 0018 | 0023 |
| 100 | 0493 | 0005 | 0009 | 0014 | 0019 | 0024 |
| 96 | 0532 | 0005 | 0010 | 0015 | 0020 | 0025 |
| 92 | 0575 | 0005 | 0010 | 0015 | 0020 | 0026 |

Referring to FIGURE 1, it will be noted that the switches 200 through 213 are arranged in rows with each row representing a different decade and each switch in the decade now being designated by a single numeral which represents the number of conductance units in terms of that decade. Using this arrangement, it is only necessary to turn on certain of the switches 200 through 213 in any given row until the total number of conductance units indicated as being switched on in that row equals the desired numeral. For example, if a pressure span of 100 inches of water is required, Table III shows that 0493 conductance units must be inserted in parallel with the force motor 43 as mentioned above. Referring specifically to FIGURE 1, it will be noted that three conductance units are placed in parallel by turning on switches 200 and 201 which represent one and two conductance units respectively and which, in parallel, produce three conductance units. Similarly, by turning on switches 204 and 207, ninety conductance units are added; and by turning on switch 210, four hundred conductance units are added. Therefore, it is merely necessary for the operator to tabulate the total number of units in each row which are on to provide a reading which is the same as the initial table setting number.

As a practical matter, exact resistive values are not used because they are not generally economically obtainable. Therefore, some error will be introduced for a given span adjuster setting. For this reason, a list of incremental settings are shown in Table III to correct for such errors during the span adjustment. It is felt that the use of these incremental settings in combination with the initial setting can be more clearly understood by describing a typical span adjustment procedure in complete detail to include certain arbitrarily chosen values.

Assuming that an input pressure span of 100 inches of water is required, the numerals corresponding to the conductance required to give the proper output readings for the desired full span of the applied pressure are chosen; in this particular example, 0493 is chosen. The switches in each row required to produce these numerals are then closed by turning them on. With a minimum pressure (e.g. 50 inches of water) applied, the zero set knob 65 is rotated until the proper zero or minimum output current is obtained. In this particular case it will be assumed that a zero current of 10 ma. is desired. Then the maximum pressure (e.g. 150 inches of water) is applied and the value of the output current is noted and compared with an acceptable maximum, which in this case is 50 ma. If the current difference exceeds the acceptable tolerance limits, the numerals designated by the incremental setting columns are consulted and the numeral closest to the actual deviation is determined. For example, if the output current change were 40.6 ma. instead of 40.0 ma., 14 conductance units would be subtracted from the initial setting so that a final setting of 0479 conductance units would be set into the electrical circuit 60. After such a change, the zero reading should be readjusted if necessary and then the maximum current should be checked again.

Once the particular conductance setting for a given pressure span is finalized, it should be recorded for future use. As the pressure span is strictly predetermined by fixed resistors, which are either in the circuit or out of the circuit, the recorded value provides good repeatability of span so only a zero current adjustment should be necessary.

In summary, a pressure span adjustment means constructed in accordance with this invention is constituted by a plurality of impedance means arranged in decade groups with a binary relationship existing between the individual impedance means in a given decade group. Although the impedance means in a given decade have been shown to be in relationship 1-2-4-8, it will be obvious that other relationships as 1-2-3-4 or 1-2-4-5 or any other relationship which will in combination give the numerals from 1 through 9 could be substituted.

However, any relationship of integers other than 1-2-4-8 will have redundant combinations and, because the resistive values are not exact, different combinations giving the same numeral will have different conductance values. Therefore, the system will be less accurate.

This arrangement provides a repeatable span adjustment because the impedance means are of a fixed value and are selectively and non-redundantly switched into or out of a parallel relationship with a force motor. Furthermore, the arrangement also simplifies the span setting because it is not necessary for an operator to convert a multi-digit numeral into straight binary form. In accordance with this invention he is merely required to convert the individual digits to a binary value which is readily accomplished.

The foregoing is a description of an illustrative embodiment of a binary coded decimal span adjustment means for a differential pressure transducer, and it is the intention in the appended claims to cover all forms of the invention which fall within the scope of the invention.

What is claimed as new and desired to be secured by Letters Patent of the United States is:

1. In a pressure measuring device including a force balance transmitter including a force motor, current means to energize the force motor, the force motor maintaining the transmitter in a balanced condition and the current required for energization of the force motor indicating the pressure and means for measuring the current, the improvement of a span adjustment means including:
    (a) a plurality of shunt groups, each of said shunt groups representing a decimal decade, each of said shunt groups being constituted by a plurality of shunt impedance means having admittances in a binary relationship, and
    (b) a plurality of switching means, each of said switching means selectively connecting one of said impedance means in parallel with the force motor to thereby adjust the current span which energizes the current measuring means for a given span of applied pressures.

2. A pressure measuring device as recited in claim 1 wherein each of said impedance means is constituted by a resistor, said resistors in each of said groups having conductances which are in the binary relationship 1-2-4-8, the conductance values in adjacent groups being decimally related.

3. A pressure measuring device as recited in claim 1 wherein said switching means are constituted by a plurality of individual switches, said switches being arranged in rows with the switches in a given row being designated to control a particular resistance, and thereby switch in a particular value of conductance, each of the rows being arranged decimally.

No references cited.

LOUIS R. PRINCE, *Primary Examiner.*

DONALD O. WOODIEL, *Assistant Examiner.*